(12) United States Patent
Ramanujan et al.

(10) Patent No.: US 8,859,469 B2
(45) Date of Patent: Oct. 14, 2014

(54) PROTEIN CHIP AND PRODUCTION METHOD THEREOF

(75) Inventors: Chandra Sekar Ramanujan, Oxford (GB); Koji Sumitomo, Atsugi (JP); Maurits R. R. de Planque, Southampton (GB); Hiroki Hibino, Atsugi (JP); John F. Ryan, Oxford (GB); Keiichi Torimitsu, Atsugi (JP)

(73) Assignees: Nippon Telegraph and Telephone Corporation, Tokyo (JP); Isis Innovation Limited, Oxford (GB)

( * ) Notice: Subject to any disclaimer, the term of this patent is extended or adjusted under 35 U.S.C. 154(b) by 1300 days.

(21) Appl. No.: 11/972,820

(22) Filed: Jan. 11, 2008

(65) Prior Publication Data

US 2009/0181862 A1    Jul. 16, 2009

(51) Int. Cl.
*C40B 40/10* (2006.01)
*C40B 40/02* (2006.01)
*C40B 40/16* (2006.01)
*C40B 50/18* (2006.01)
*B82Y 30/00* (2011.01)
*C40B 60/12* (2006.01)
*C40B 80/00* (2006.01)

(52) U.S. Cl.
CPC .......... *C40B 60/12* (2013.01); *B01J 2219/0063* (2013.01); *B01J 2219/00576* (2013.01); *B01J 2219/00664* (2013.01); *B82Y 30/00* (2013.01); *B01J 2219/00659* (2013.01); *B01J 2219/00527* (2013.01); *B01J 2219/00626* (2013.01); *B01J 2219/00632* (2013.01); *B01J 2219/00612* (2013.01); *B01J 2219/00677* (2013.01); *C40B 80/00* (2013.01); *B01J 2219/00605* (2013.01); *B01J 2219/00648* (2013.01); *C40B 50/18* (2013.01); *B01J 2219/00596* (2013.01); *B01J 2219/00617* (2013.01)
USPC .................... 506/18; 506/13; 506/21; 506/32

(58) Field of Classification Search
USPC .......................................... 506/13, 18, 21, 32
See application file for complete search history.

(56) References Cited

U.S. PATENT DOCUMENTS

2006/0183166 A1*   8/2006   Mayer et al. ................... 435/7.9

FOREIGN PATENT DOCUMENTS

| JP | 2005-69988 | | 3/2005 | |
| JP | 2006-198729 | * | 3/2006 | ............... B82B 3/00 |
| JP | 2006-198729 | | 8/2006 | |

OTHER PUBLICATIONS

Pfeiffer et al., 2006, Quantification of Oligonucleotide Modifications of Small Unilamellar Lipid Vesicles, Anal. Chem. 78: 7493-7498.*
Jung et al., 2006, Atomic Force Microscopy Observation of Highly Arrayed Phospholipid Bilayer Vesicle on a Gold Surface, Journal of Bioscience and Bioengineering, 102(1): 28-33.*
Guo et al., published online Sep. 19, 2007, One-step immobilization of alkanethiol/glycolipid vesicles onto gold electrode: Amperometric detection of Concanavalin A, Colliods and Surfaces B: Biointerfaces, 62: 146-150.*

* cited by examiner

*Primary Examiner* — Amber D Steele
(74) *Attorney, Agent, or Firm* — Harness, Dickey & Pierce, P.L.C.

(57) ABSTRACT

A protein chip including at least a substrate having a plurality of steps which are regularly arranged on one surface thereof; a plurality of metallic microstructures arranged in the steps; and a lipid vesicle in which an outer surface thereof is modified by a functional group and a protein is present in a lipid bilayer thereof. The metallic microstructures and the lipid vesicle are bound via the functional group to provide the protein on the substrate.

6 Claims, 7 Drawing Sheets

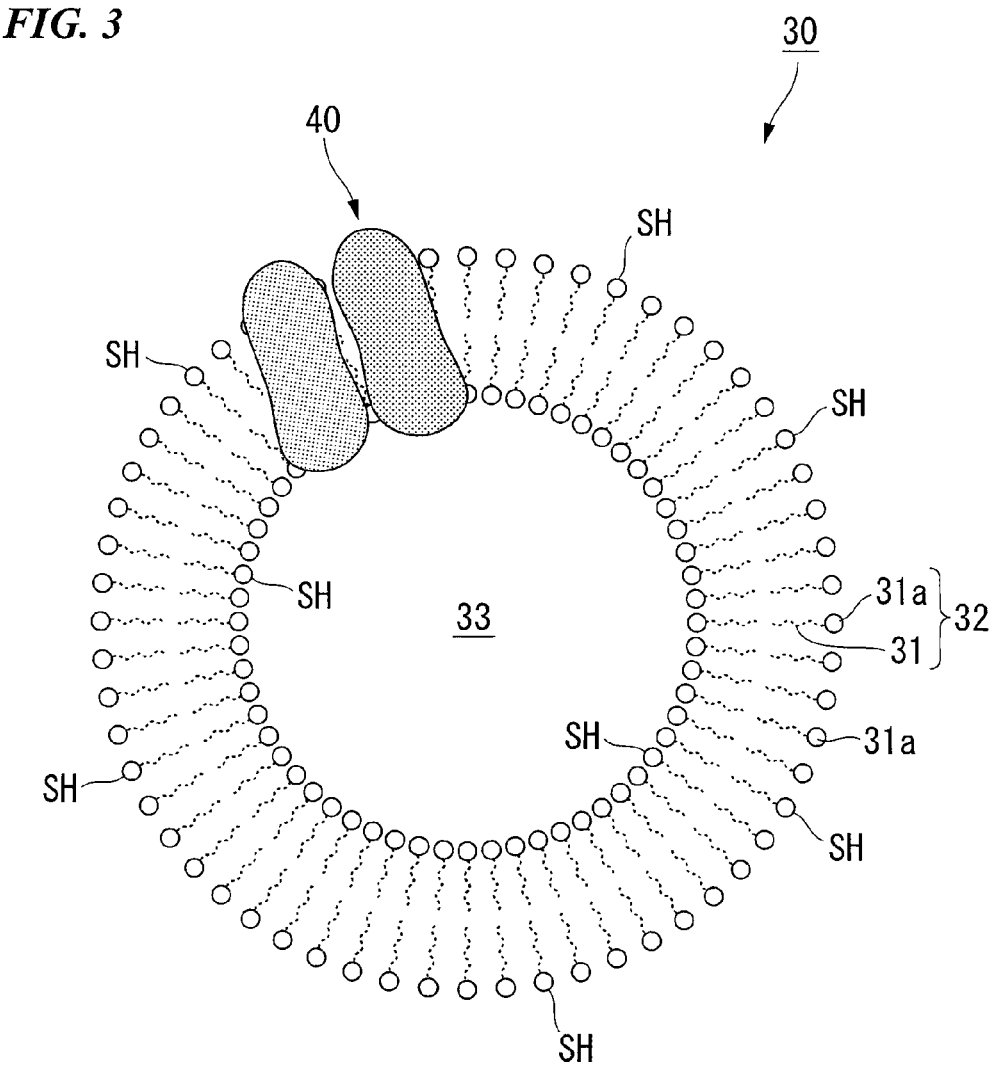

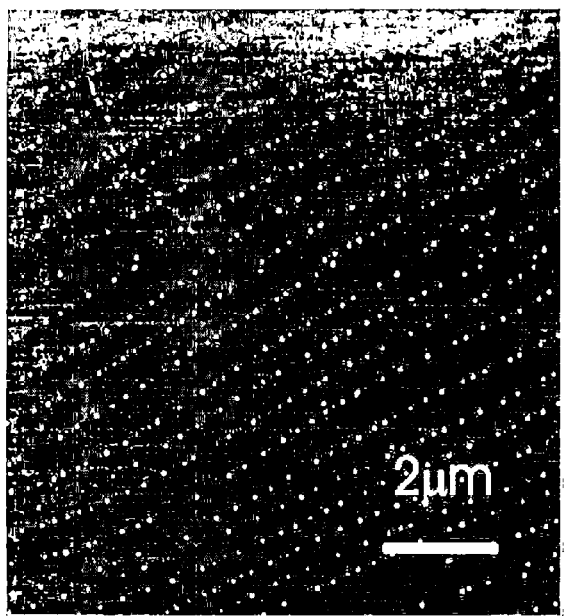
FIG. 5A
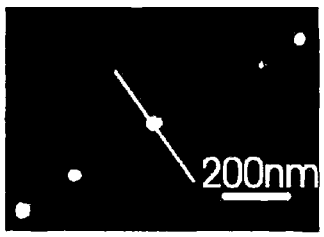
FIG. 5B
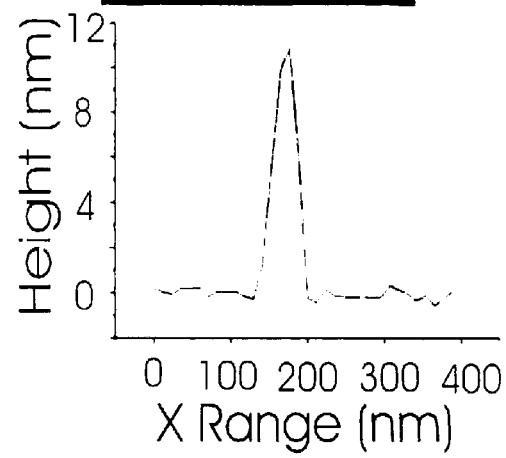
FIG. 5C
FIG. 5D
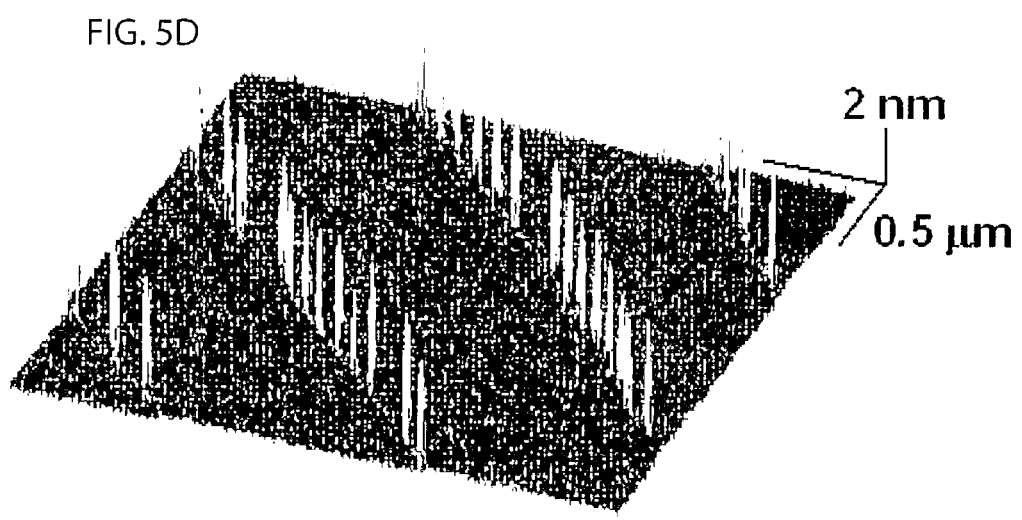

Fig. 7A
Fig. 7B
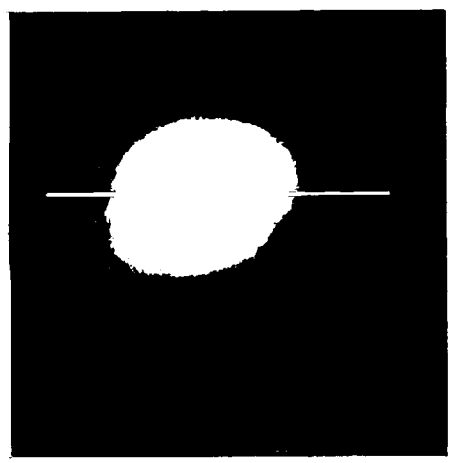
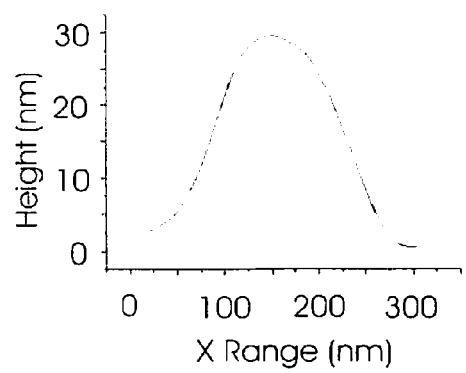
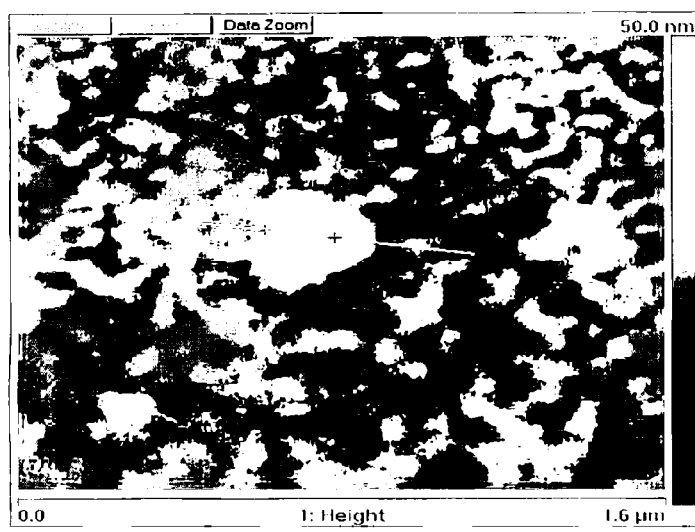
Fig. 7C
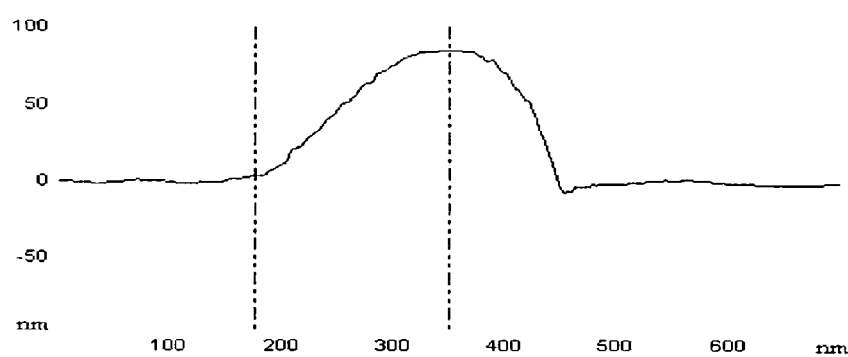
Fig. 7D

PROTEIN CHIP AND PRODUCTION METHOD THEREOF

BACKGROUND OF THE INVENTION

1. Field of the Invention

The present invention relates to a protein chip and more specifically, a protein chip in which proteins are densely arranged on a substrate without impairing their intrinsic functions, and the production method of the protein chip.

2. Description of the Related Art

Since array technology using DNA chips enables the simultaneous expression analysis of numerous genes, they have played an important role as a tool for studying genomics. In recent years, it has been proposed that similar array technology (protein chips) could even be employed with the proteins, which are the most complex and diverse molecules in living organisms, in order to elucidate their functions. Expectations are especially high with protein chips since they enable protein analysis using trace amounts of proteins and they can be applied not only to research but also to a wide range of fields such as clinical diagnosis, health monitoring, drug development, and environmental and food inspections. Information on a wide range of topics, ranging from the recognition mechanisms and dynamics of complex interactions among proteins to the quantitative analysis thereof is desired, and thus higher throughput processing using protein chips is an important issue.

When preparing protein chips, microcontact printing and ink-jet method have both conventionally been used as methods for densely arranging proteins. In microcontact printing, the minimum spot size of the protein printed is 2 μm. However, the ink-jet method disclosed in Japanese Laid-Open Patent Application No. 2005-69988 is able to print tiny amounts of protein droplets on about the order of picoliters in which a spot size of 50 to 500 μm is achieved. In both cases, spaces of a few micrometers to a few hundred of micrometers are required.

However, in order to carry out the analysis more effectively, proteins must be arranged in an even higher density. Thus, the development of a protein chip where proteins spotted at intervals on the order of one nanometer are expected. Moreover, in the conventional method of fixing proteins onto a substrate, the three-dimensional structures or activities of the proteins were not necessarily taken into account. Therefore, it was possible that the original functions of the proteins were impaired with the conventional technologies.

SUMMARY OF THE INVENTION

Accordingly, an object of the present invention includes to provide a protein chip in which proteins are densely arranged on a substrate and where the arranged proteins maintain their intrinsic functions. Another object of the present invention is to provide a method of producing protein chips which is capable of both densely arranging proteins on a substrate and arranging the proteins without impairing their intrinsic functions.

A first aspect of the present invention is a protein chip including at least a substrate having a plurality of steps which are arranged regularly on one surface thereof; a plurality of metallic microstructures arranged on the steps; and a lipid vesicle in which an outer surface thereof is modified by a functional group and a protein is present in a lipid bilayer thereof, wherein the metallic microstructures and the lipid vesicle are bound via the functional group to provide the protein on the substrate.

A second aspect of the present invention is the above-mentioned protein chip in which the metallic microstructures are made of gold.

A third aspect of the present invention is the above-mentioned protein chip in which the metallic microstructures form a nanodot array.

A fourth aspect of the present invention is the above-mentioned protein chip in which the functional group is at least one selected from the group consisting of a thiol group, an amide group, a sulfide group, a thioacetyl group, and a disulfide group.

A fifth aspect of the present invention is the above-mentioned protein chip in which the density of the lipid vesicle arranged on the substrate is $10^{12}$ to $10^{14}$ vesicles per m².

A sixth aspect of the present invention is the above-mentioned protein chip in which the protein is a membrane protein.

A seventh aspect of the present invention is the above-mentioned protein chip in which the membrane protein is a TRP channel, an ATP receptor, a serotonin receptor, an NMDA receptor, an AMPA receptor, a kainate receptor, a GABA receptor, an adenosine receptor, an adrenaline receptor, a metabotropic glutamate receptor, or an opioid receptor.

An eighth aspect of the present invention is a method for manufacturing a protein chip including: a step of arranging a plurality of metallic microstructures onto a plurality of steps which are arranged regularly on one surface of a substrate; and a step of arranging a protein on the substrate by binding a lipid vesicle, in which an outer surface thereof is modified by a functional group and a protein is present in a lipid bilayer thereof, to the metallic microstructures via the functional group.

The functional group present in the surface of a lipid vesicle binds to the metallic microstructures arranged in high density so as to arrange the proteins present in the lipid vesicle on a substrate in the protein chip of the present invention. Accordingly, it is possible to obtain a protein chip where proteins are densely arranged on a substrate. Moreover, the proteins are present in the lipid bilayer of the lipid vesicle and the functional group in the surface of the lipid vesicle binds to the substrate via the metallic microstructures. For this reason, the proteins maintain a stable presence in the lipid bilayer without directly interacting with the metallic microstructures or the substrate, and thus, the proteins can retain their intrinsic functions.

In the method of the present invention for preparing protein chips, a lipid vesicle can align itself by the functional group in the surface of the lipid vesicle to selectively adsorb or bind to metallic microstructures. Therefore, it is possible to form proteins on a substrate in array at a low cost and also to avoid affecting the proteins when implementing the lipid vesicle on the substrate. Thus, the proteins can be arranged on the substrate via metallic microstructures while maintaining their original functions. Moreover, since the metallic microstructures are formed on the substrate by crystallization, they can be formed on the substrate at a high density. Furthermore, proteins are implemented in high density since the proteins are arranged on a substrate by a lipid vesicle adsorbing to these metallic microstructures.

The present invention may be adapted to various inspection devices, such as a genetic screening device, for drug development and medical treatment, etc.

BRIEF DESCRIPTION OF THE DRAWINGS

Some of the features and advantages of the invention have been described, and others will become apparent from the detailed description which follows and from the accompanying drawings, in which:

FIG. 3 is a cross sectional diagram of a lipid vesicle of the present invention which contains proteins:

FIGS. 5A to 5D are diagrams showing images of metallic microstructures arranged on a substrate of the present invention;

FIGS. 7A to 7D are diagrams showing AFM images and the like of a lipid vesicle binding to metallic microstructures.

DETAILED DESCRIPTION OF THE INVENTION

The invention summarized above and defined by the enumerated claims may be better understood by referring to the following detailed description, which should be read with reference to the accompanying drawings. This detailed description of a particular preferred embodiments, set out below to enable one to build and use one particular implementation of the invention, is not intended to limit the enumerated claims, but to serve as a particular example of the invention.

Figure 1:
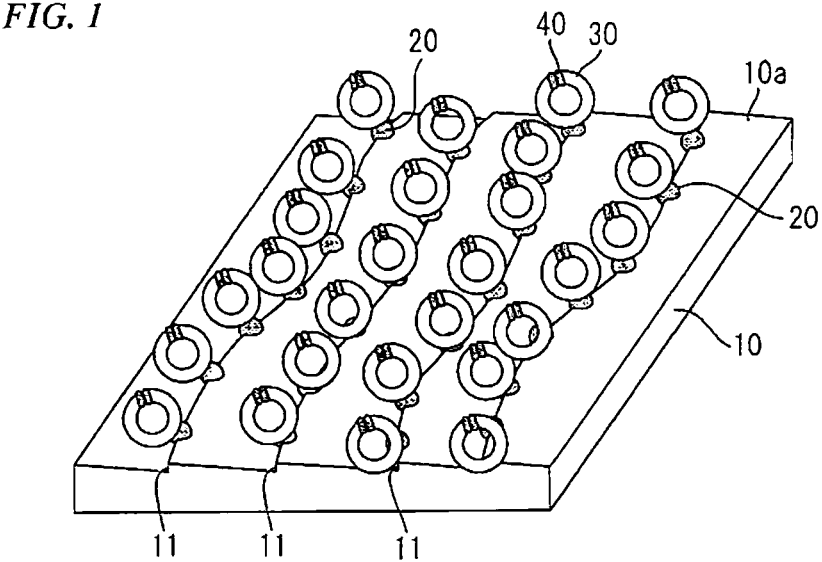
FIG. 1 is a schematic diagram of a protein chip of the present invention.

FIG. 1 is a schematic diagram showing a protein chip 1 of the present invention. The protein chip 1 is, roughly speaking, configured from a substrate 10 having a plurality of steps 11 which are arranged regularly on one surface 10a of the substrate; a plurality of metallic microstructures 20 arranged in the steps 11; and a lipid vesicle 30 in which an outer surface thereof is modified by a functional group and a protein 40 is present in a lipid bilayer thereof. In addition, the protein 40 is connected to the substrate 10 by the bond between the metallic microstructures 20 and the lipid vesicle 30 via the functional group. Each component will be described in detail below.

Figure 2:
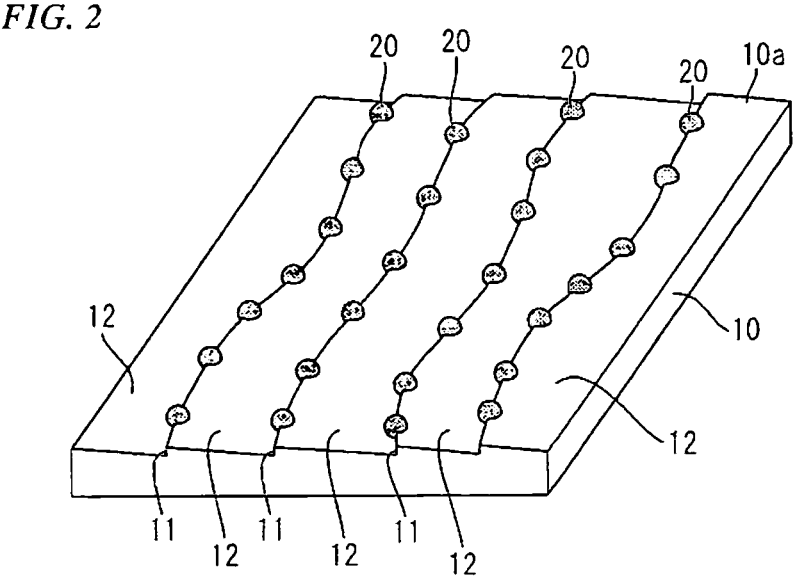
FIG. 2 is a schematic diagram of metallic microstructures arranged on a substrate of the present invention.

FIG. 2 is a perspective view schematically showing the substrate 10. A plurality of steps 11 are arranged regularly on the crystal surface of the substrate 10 (surface 10a) and a plurality of metallic microstructures 20 are arranged on these steps 11. The substrate 10 is formed by an Si (111) wafer having a sufficiently small miss-cut angle, or formed by a glass plate. The miss-cut angle of the substrate 10 is, for example, 0.01° to 0.1°. The steps 11 are arranged on one surface 10a of the substrate 10 so that their heights are 0.2 to 0.4 nm. Since the metallic microstructures 20 arranged on the steps 11 readily form in the curved or protruded parts of the steps 11, it is preferable to use materials having a periodically changing shape in the extending direction. By changing the formability of the metallic microstructures 20 on the same step 11, the formation of metallic microstructures 20 can be formed which is arranged not only periodically due to the interval of the step 11 but also regularly in the direction along the step 11. In this process, since the respective metallic microstructures 20 incorporate atoms of the same size, the uniformity in size of the metallic microstructures 20 is also enhanced.

In addition, terraces 12 having a width of 400 to 600 nm are arranged between the steps 11.

Note that the substrate shown in FIG. 2 can be obtained by the method disclosed in Japanese Laid-Open Patent Application No. 2006-198729.

Metallic microstructures 20 are arranged on the steps 11 formed on the surface 10a of the substrate 10 and forming a nanodot array where metal droplets are crystallized. The size of the metallic microstructures 20 is preferably such that one lipid vesicle 30 binds to one metallic microstructure 20. Metallic microstructures 20 have a height in the overlapping direction with the substrate 10 of 9 to 11 nm and have a width of 20 to 30 nm. Additionally, the density of the metallic microstructures 20 on the substrate 10 is $10^{12}$ to $10^{14}$ vesicles per $m^2$.

The metallic microstructures 20 are preferably formed from gold. By forming a covalent bond with the functional group arranged on the outer surface of the lipid vesicle 30, the metallic microstructures 20 selectively adsorb the lipid vesicle 30, and thus it is possible to readily arrange the lipid vesicle 30 on the surface 10a of the substrate 10.

FIG. 3 is a cross sectional diagram schematically showing the lipid vesicle 30. The lipid vesicle 30 has a spherical lipid bilayer 32 formed of a phospholipid 31 and the protein 40 is present in the lipid bilayer 32.

The phospholipid 31 constituting the lipid vesicle 30 contains at least a functional group which binds with the metallic microstructures 20 in its head 31a. Examples of the phospholipid 31 include 1,2-dipalmitoyl-sn-glycero-3-phosphothioethanol (DPPTE) having a thiol group. The lipid vesicle 30 are fixed onto the substrate 10 by the covalent bond between the functional group, such as a thiol group, and the metallic microstructures 20 arranged on the substrate 10.

In addition to a thiol group, an amide group, a sulfide group, a thioacetyl group, or a disulfide group which can form a covalent bond with gold can be used as such a functional group.

In the present invention, the lipid vesicle 30 is formed from a mixture of the phospholipid having a functional group which binds with the metallic microstructures 20 and a phospholipid such as 1-palmitoyl-2-oleoyl-sn-glycero-3-phosphatidylcholine (POPC) and 1-palmitoyl-2-oleoyl-sn-glycero-3-[phospho-rac-(1-glycerol)](POPG) which has structures similar to the structures in nature where the phospholipids are mixed in a desired proportion.

By encapsulating a labeling reagent (not illustrated) such as a fluorescent reagent in a lumen 33 of the lipid vesicle 30, the utility thereof is improved. Especially when encapsulating pigments with different fluorescent wavelengths in respective lipid vesicles carrying different proteins, it will easily be possible to identify each lipid vesicle. Known reagents can be used for such a labeling reagent and examples thereof include FITC (registered trademark; fluorescein), rhodamine, and cyanines such as Cy3 (registered trademark) and Cy5 (registered trademark).

The protein 40 is provided in the lipid bilayer 32 of the lipid vesicle 30 and only one type of protein 40 is present in one lipid vesicle 30. Additionally, the protein 40 has a domain outside the lipid vesicle 30. The protein 40 may be a monomer or a multimer. The protein 40 may also be a native protein collected from the living specimen or an artificially synthesized protein expressed in cultured cells such as Sf9 or in *Escherichia coli* cells. These proteins 40 can be synthesized and purified by known methods, and kits or the like may also be used.

It is preferable to use a membrane protein present in the lipid bilayer of a cell membrane or the like in living organisms as the protein 40. Since the membrane proteins have both a hydrophobic region and a hydrophilic region, it is possible to readily provide a membrane protein in the lipid bilayer 32 of the lipid vesicle 30. Since the membrane proteins in particular are involved in cellular signal transduction, they are highly useful in pathological studies, drug developments, and the like. Additionally, the protein 40 may be a protein other than the membrane proteins, such as a glycoprotein or an antibody. It is also possible to bind the protein 40 to the surface of the lipid vesicle 30 using a linker or the like.

For such membrane proteins, for example, receptors such as ion channel receptors and G protein-coupled receptors, and ion channels can be used. For such ion channel receptors, for example, TRP (transient receptor potential) channels (TRPV1, TRPV2, TRPV3, TRPV4, TRPV5, TRPV6, TRPV8, TRPA1, TRPC1, TRPC2, TRPC3, TRPC4, TRPC5, TRPC6, TRPC7, TRPM1, TRPM2, TRPM3, TRPM4, TRPM5, TRPM6, TRPM7, TRPM8, TRPN1, TRPML1, TRPML2, TRPML3, TRPY1, TRPP1, TRPP2, TRPP3, TRPP4, and TRPP5) involved in cellular signal transduction, temperature sensing, inflammation, and pain; ATP receptors (P2X1, P2X2, P2X3, P2X4, P2X5, P2X6, and P2X7) involved in cellular signal transduction and pain; serotonin receptors (5-HT1, 5-HT2, 5-HT4, 5-HT6, and 5-HT7) involved in cellular signal transduction and emotion; NMDA receptors (NR1, NR2A, and NR2B) involved in cellular signal transduction and excitatory neurotransmission; AMPA receptors (GluR1, GluR2, GluR3, and GluR4) involved in cellular signal transduction and excitatory neurotransmission; kainate receptors (GluR5 and GluR7) involved in the cellular signal transduction and excitatory neurotransmission; and GABA receptors (GABAA receptors and GABAC receptors) can be used.

Additionally, as a G protein-coupled receptor, for example, adenosine receptors (A1, A2A, A2B, and A3) involved in cellular signal transduction; ATP receptors (P2Y1, P2Y2, P2Y4, P2Y6, P2Y11, P2Y12, P2Y13, and P2Y14) involved in cellular signal transduction; serotonin receptors (5-HT3) involved in cellular signal transduction; adrenaline receptors ($\alpha$1, $\alpha$2, $\beta$1, and $\beta$2) involved in cellular signal transduction and pain; metabotropic glutamate receptors (mGluR1, mGluR2, mGluR3, mGluR5, mGluR6, mGluR7, and mGluR8) involved in cellular signal transduction; GABA receptors involved in cellular signal transduction; and opioid receptors ($\upsilon$ receptor, $\delta$ receptor, and $\kappa$ receptor) can be used.

It may also be possible to genetically manipulate the protein 40 so that it exhibits fluorescence. By using fluorescence, a lipid vesicle carrying a specific protein can easily be identified. Known fluorescent proteins such as GFP, CFP, and YFP can be used for this purpose. Especially when the protein 40 is prepared and incorporated in the lipid vesicle 30 so that the protein domain outside the lipid vesicle 30 fluoresces, by labeling the material which binds with a protein with fluorescence, a conformational change occurring as a result of the binding can also be detected using FRET (fluorescence Resonance Energy Transfer).

In addition, it is also possible to genetically manipulate the protein 40 so that it has a functional group, such as an SH group, on the surface thereof, which binds to the metallic microstructures 20 on the substrate 10. This would enable the protein provided in the lipid vesicle 30 to bind with the metallic microstructures 20 on the substrate 10 directly by means of a functional group.

In the protein chip of the present invention, the distance between each lipid vesicle 30 can readily be made into a short pitch of a few hundreds of nanometers. For the analysis between the short pitches, a near-field optical microscope (NSOM/SNOM) can be used. Detailed analysis with a resolution of 100 nm will be possible especially when combined with an AFM (atomic force microscope), and thus each lipid vesicle can be analyzed with a high spatial resolution. Accordingly, a target protein may be detected on the substrate through the interaction of the protein 40 of the lipid vesicle 30 arranged on the substrate 10 and a fluorescence-labeled antibody which specifically binds to the protein 40.

In the protein chip 1 of the present invention, the lipid vesicle 30 where the protein 40 is present in the lipid bilayer 32 binds to the metallic microstructures 20 densely arranged on the surface 10a of the substrate 10. Accordingly, it is possible to obtain the protein chip 1 where the protein 40 is densely arranged on the substrate 10. Thus, it is possible to provide the protein chip 1 with which even higher throughput can be achieved. Particularly, since the lipid vesicle 30 and the metallic microstructures 20 are bound via the functional group which is provided in the surface of the lipid vesicle 30, the protein 40 which is present in the lipid vesicle 30 is arranged on the surface 10a of the substrate 10 without interacting with the metallic microstructures 20 or the substrate 10. For this reason, the protein 40 is not affected and denaturing of the protein 40 is suppressed, and thus the protein 40 is arranged on the surface 10a of the substrate 10 while retaining its original functions. When using a membrane protein as the protein 40, the protein can be arranged on the surface 10a of the substrate 10 in a state which is much closer to the in vivo state thereof. Thus, the functions of the protein 40 and/or its interactions with other molecules can be studied in great detail.

<Production Method of Protein Chip>

Next, a method of producing the protein chip 1 according to the present invention will be described.

(Production of Substrate)

Figure 4A:
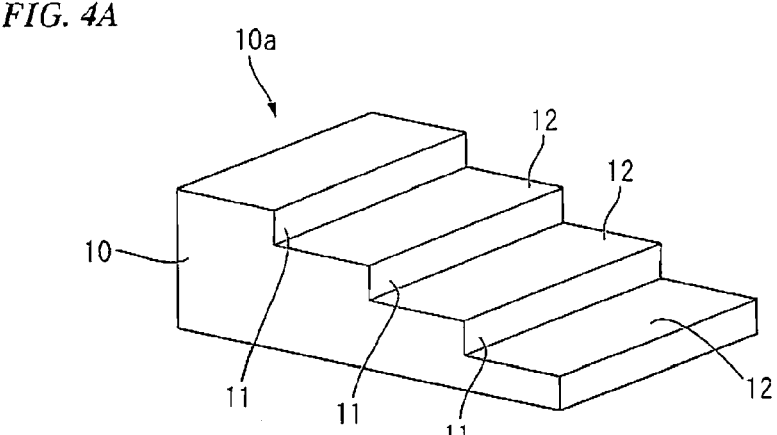
FIGS. 4A to 4C are cross sectional diagrams of a process for manufacturing a substrate according to the protein chip of the present invention.

First, a plurality of steps 11 are formed on the crystal surface of the substrate 10 (one surface 10a of the substrate 10) so as to be arranged regularly as shown in FIG. 4A.

To start with, the surface 10a of the substrate 10 is washed so that the above-mentioned surface structure appears. At this time, the direction and interval of the steps 11 formed on the surface 10a of the substrate 10 may be controlled by the degree of the angle of the substrate orientation inclined from the low index plane direction. Also, linear steps or periodically curved steps may be obtained depending on the direction of the steps 11. Moreover, it is possible to alter the shape and arrangement of the steps 11 by growing Si, which forms the substrate 10, in a step-flowing manner on the surface 10a of the substrate 10.

Then, a second substance which is different from Si, such as gold, is deposited on the surface 10a of the substrate 10. By depositing the second substance on the surface 10a, a secondary surface phase in which a plurality of steps 11 are arranged regularly may be obtained. The secondary surface phase is specific to the second substrate deposited.

For the case where the secondary surface phase varies depending on the amount of deposition, a deposition process is continued until the secondary surface phase, which requires the largest deposition amount, covers the entire surface 10a of the substrate 10. Since mass transport of the substrate materials may occur during the formation of the secondary surface phase, growth conditions which allow the substrate materials to sufficiently diffuse are used so that no secondary islands or holes are formed on the terraces 12. It is also possible to change the shape of the steps 11 during formation of the secondary surface by utilizing the mass transport of the substrate materials.

Figure 4B:
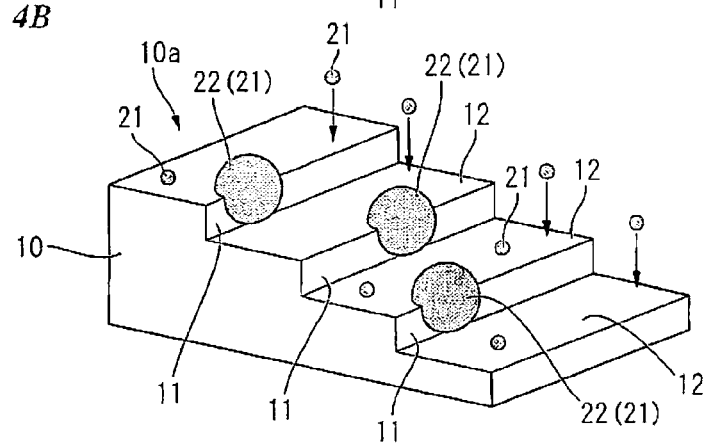

Then, under the condition in which the gold 21 is liquefied, a secondary surface phase is arranged as shown in FIG. 4B. In this manner, minute droplet 22 made from gold 21 is formed in the vicinity of the steps 11.

Note that the gold 21 arranged on the secondary surface phase may incorporate substrate materials through a thin surface phase and form an alloy. In such a case, it is possible to form droplets made of the alloy near the steps 11 by setting a temperature condition in which the alloy is liquefied.

Figure 4C:
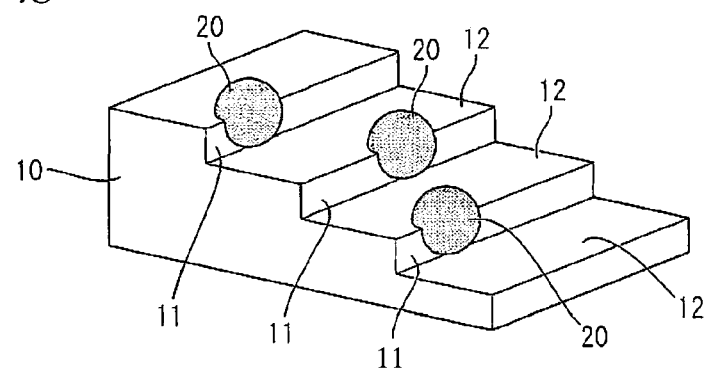

After this, metallic microstructures 20 which exert quantum effect are formed by lowering the temperature of the substrate 10 and crystallizing the droplets 22 as shown in FIG. 4C. Note that it is possible to carry out the crystallization without lowering the temperature of the substrate 10 since the melting point increases as the size of the crystal increases.

The metallic microstructures 20 formed in the above-mentioned manner, are formed in the vicinity of the steps 11 which are arranged regularly on the secondary surface phase. Accordingly, the metallic microstructures 20 on the secondary surface phase are arranged periodically based on the intervals of the steps 11.

As an example of the secondary substance which forms the secondary surface phase, a substance which is capable of maintaining the shape of the steps 11 of the secondary surface phase even under the low temperature conditions used for forming the droplets 22 may be utilized.

(Preparation of Lipid Vesicle)

First, a lipid mixture in which phospholipid is dissolved in an organic solvent is prepared. As the organic solvent, such as chloroform or a mixture of chloroform and methanol, may be used. As the phospholipid, a lipid vesicle having a certain amount of thiol groups around an outer surface thereof may be formed by adding a suitable amount of phospholipid having a functional group such as a thiol group which binds to the metallic microstructures 20 at its end (for example, DPPTE).

Then, the organic solvent is removed from the lipid mixture by reducing the pressure, and a lipid film is obtained. Note that the rate of removing the organic solvent may be accelerated by using nitrogen gas during the process of reducing pressure.

Next, the lipid film is hydrated to obtain a first suspension in which multilayer lipid vesicles are formed. As a solution for hydration, a buffer solution of lactic acid, phosphoric acid, citric acid, boric acid, tris-hydroxymethylaminomethane, HEPES, etc., may be used. After the buffer solution is added, hydration and dispersion are carried out by using, for example, a vortex mixer. After the addition of the buffer solution, it is preferable to use argon or nitrogen gas and increase the temperature so as to be equal to or higher than the phase transition temperature of the phospholipids.

Thereafter, the freezing and melting processes of the suspension are repeated in order to make uniform the size of the lipid vesicles, and a second suspension is obtained.

Then, lipid vesicles of uniform size may be obtained by passing the second suspension through a filter of predetermined pore size. The pore size of the filter may be suitably adjusted by taking into account the size of the metallic microstructures 20, the mass of proteins to be arranged, etc. The pore size of the filter may be, for example, 30 nm to 1 μm.

Note that it is possible to make the size of the lipid vesicle 30 uniform in the first suspension by using a supersonic agitation method. Although both a probe type and a bath type sonicator may be employed, there may be a danger that metal ions are diffused into the solution when the probe type is used since a metal chip directly contacts the first suspension. Also, the uniformity of liposome may be gradually lost when the probe type sonicator is employed since the supersonic waves thereof are not constant in the solution. Accordingly, it is preferable to use a bath type sonicator when the lipid vesicle is formed by using the supersonic agitation method.

The above-mentioned lipid vesicle 30 is readily formed, and it is easy to adjust the amount of the protein 40 to be incorporated into the lipid vesicle 30 or the size of the lipid vesicle 30. The amount and type of the protein 40 to be arranged may be controlled by changing the size of the lipid vesicle 30, the type of lipid molecules which form the lipid vesicle 30, the functional groups present on the surface of the lipid vesicle 30 and so forth.

Next, the lipid vesicle prepared in the manner explained above is mixed, in a desirable ratio, with proteins which have been separately purified by using a conventional method, and the mixture is filled in a semipermeable membrane to reconstruct the protein 40 into the lipid vesicle 30 by dialysis. Examples of solutions that may be used for dialysis include a buffer solution of lactic acid, phosphoric acid, citric acid, boric acid, tris-hydroxymethylaminomethane, and HEPES. By repeating the dialysis process, proteins may be incorporated into the lipid double layer of the lipid vesicle having a functional group on the surface thereof. It is preferable to carry out the dialysis process for one week at 4° C. By using the dialysis process, it becomes possible to readily adjust the amount of proteins incorporated into the lipid double layer of the lipid vesicle by only controlling the amount of proteins to be mixed.

(Binding of Lipid Vesicle to Substrate)

By immersing a substrate into the lipid vesicle prepared as explained above, the functional group on the surface of the lipid vesicle binds to the metallic microstructures on the substrate. After this, by washing the substrate, if necessary, lipid vesicles which have been non-specifically bound, are removed, and a protein chip according to the present invention is obtained.

As an alternative, it is possible to produce the protein chip by binding the lipid vesicle, prior to the incorporation of proteins, to the metallic microstructures 30 of the substrate 20, and then fusing the lipid vesicles on the substrate with protein-containing lipid vesicles which have been prepared separately. At this time, it is possible to control the process so that the protein-containing lipid vesicles do not fuse each other but fuse with the lipid vesicles on the substrate by forming the lipid vesicles by mixing lipids having an electric charge.

Thereafter, it becomes possible to make an array of proteins of various kinds on the substrate by suitably repeating the selective absorption (or fusion) process of the protein-containing lipid vesicles and observing the substrate using the NSOM/SNOM and AFM.

EXAMPLES (Production of Substrate)

A Si (111) substrate of 5 mm square was prepared, and after chemically cleaning it, the Si (111) substrate was subjected to an ultra-high vacuum and degassed at a substrate temperature of 600° C. After this, linear steps were formed on the substrate surface at equal intervals by healing to 1200° C. and cleaning. Gold was deposited on the surface of the substrate at a substrate temperature of 700° C. so as to form a layer of about one atom thickness, and a √3×√3 structure of gold secondary surface phase was formed. Then, the temperature of the substrate was maintained to be 400° C., and further gold was deposited. After the growth of gold particles, the substrate was cooled, and a substrate on which a plurality of metallic microstructures was arranged was obtained. The surface of the substrate was observed under AFM, and the result was shown in FIGS. 5A-5D.

FIG. 5A shows an AFM image of the substrate surface. FIG. 5B shows an enlarged view of FIG. 5A. FIG. 5C is a graph showing the relationship between the intervals of metallic microstructures and the height thereof shown in FIG. 5A. FIG. 5D shows a three dimensional image of the metallic microstructures on the substrate shown in FIG. 5A.

As shown in FIGS. 5, the metallic microstructures having a diameter of about 20 nm to 30 nm were observed. It was also observed that the metallic microstructure were arranged along the steps on the substrate with an interval of 400 nm. The width of terrace was 400 nm to 600 nm. It was confirmed, as shown in FIG. 5C and 5D, that the metallic microstructures were uniformly arranged on the substrate with a constant interval and height.

(Preparation of Vesicle)

DPPTE (1.4 mM) was mixed with a solution of methanol/chloroform (1/1. v/v) in which a POPC was dissolved in a ratio of 2:98 (weight ratio, DPPTE: POPC). Then, the organic solvent was removed by reducing pressure under a nitrogen atmosphere to obtain a lipid film. The state of reduced pressure was maintained for 14 hours to remove any remaining organic solvent and dry the lipid film. After this, 1.6 ml of NaCl (50 mM) was added to the lipid film to obtain a suspension of multilayer lipid vesicles. Then, the size of the multilayer lipid vesicles was made uniform by repeating a freezing-melting process of the suspension 5 to 10 times. The suspension was passed through a polycarbonate filter having a pore size of 100 nm for 21 times using a small extruder, and a lipid suspension containing vesicles of 100±20 nm was obtained.

Figure 6:
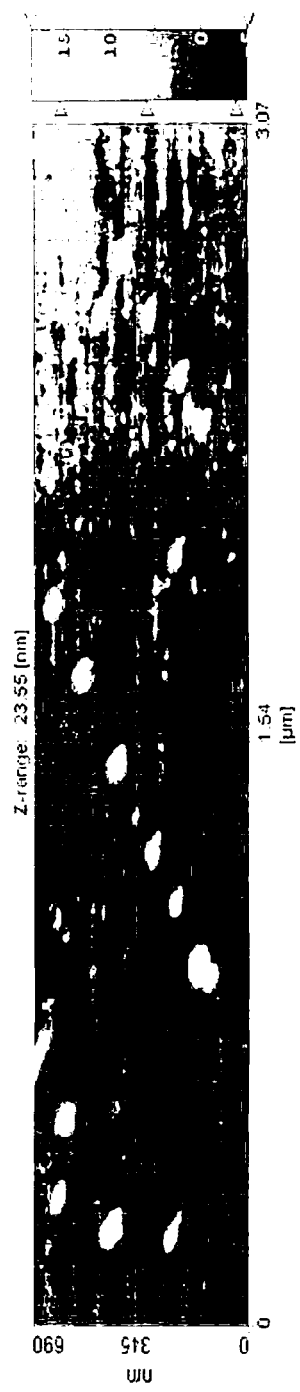
FIG. 6 is a diagram showing an AFM image of a lipid vesicle binding to metallic microstructures.

About 10 μl of this lipid suspension was placed onto the substrate on which the metallic microstructures had been formed so as to form a droplet of about 3 mm in diameter. The droplet was left for 60 minutes at room temperature, and then the lipid vesicles that did not bind to the metallic microstructures of the substrate were removed using a water absorption paper. The surface of the substrate was cleaned by using 10 μl of deionized water to further remove lipid vesicles that did not bind to the metallic microstructures. The cleaning process was repeated one more time. After this, the surface of the substrate was observed by AFM. Results are shown in FIGS. 6 and 7. Note that the cleaning processes were earned out so as to avoid drying the surface of the substrate and destroying the lipid vesicles.

FIG. 6 shows an AFM image of the substrate surface. FIG. 7A shows AFM image of a lipid vesicle bound to the metallic microstructure. FIG. 7B is a graph showing the size distribution of the lipid vesicles. FIG. 7C shows a cross-sectional image of the lipid vesicle shown in FIG. 7A. FIG. 7D is a graph showing the size distribution of the lipid vesicle shown in FIG. 7C.

As shown in FIG. 6, lipid vesicles were observed on the metallic microstructures. It was also found that one lipid vesicle was bound to one metallic microstructure.

As shown in FIGS. 7, it was observed that the size of the lipid vesicles bound to the metallic microstructures was almost completely uniform.

(Incorporation of Proteins into Lipid Vesicle)

First, a glutamic acid receptor, which is a membrane protein, was purified from cerebral cortex of a rat.

The protein (200 ng) was added to 0.2 ml of the lipid suspension prepared as explained above, and dialysis was carried out for one week at 4° C. A HEPES buffer solution was used for the dialysis process. A SPECTRA/POR (a product of SPECTRUM Co. Ltd.) was also used as the semipermeable membrane. After the dialysis, a solution in the semipermeable membrane was collected to obtain lipid vesicles in which the glutamic acid receptor was contained in the lipid bilayer thereof. The lipid vesicle containing the protein was observed by AFM. Results are shown in FIG. 8.

Figure 8:
FIG. 8 is a diagram showing an AFM image of a lipid vesicle containing a protein.

As shown in FIG. 8, it was observed that the lipid bilayer became like a pouch and the protein was indicated as a bright spot therein, and confirmed that the proteins were incorporated into the lipid bilayer of the lipid vesicle.

(Binding of Lipid Vesicle to Substrate)

About 10 μl of the suspension of the lipid vesicle in which proteins had been incorporated into the lipid bilayer obtained in the above-mentioned manner, was placed onto the substrate to form a droplet of about 3 mm in diameter. The droplet was left for 60 minutes at room temperature, and then lipid vesicles that did not bind to the metallic microstructures of the substrate were removed using a water absorption paper. The surface of the substrate was cleaned by using 10 μl of deionized water to further remove the lipid vesicles that did not bind to the metallic microstructures. The cleaning process was repealed one more time to obtain a protein chip. Note that the cleaning processes were carried out so as to avoid drying the surface of the substrate and destroying the lipid vesicles.

In this manner, a protein chip in which proteins were densely arranged on one surface of the substrate was obtained.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A protein chip comprising:
a substrate having a plurality of steps which are regularly arranged on one surface thereof;
a plurality of metallic microstructures arranged in the steps; and
a lipid vesicle bound to each of the plurality of metallic microstructures, each lipid vesicle having a lipid bilayer and a functional group arranged on an outer surface thereof, where a membrane protein selected from the group consisting of an ion channel receptor, a G-protein coupled receptor, and an ion channel is present in the lipid bilayer,
wherein the metallic microstructures and the lipid vesicles are bound via the functional group to provide the protein on the substrate,
wherein a density of the metallic microstructures is $10^{12}$ to $10^{14}$ per $m^2$, and
wherein the lipid vesicles are arranged on the substrate at a density of $10^{12}$ to $10^{14}$ vesicles per $m^2$.

2. The protein chip according to claim 1, wherein the metallic microstructures are comprised of gold.

3. The protein chip according to claim 1, wherein the metallic microstructures form a nanodot array.

4. The protein chip according to claim 1, wherein the functional group is any one selected from the group consisting of a thiol group, an amide group, a sulfide group, a thioacetyl group, and a disulfide group.

5. The protein chip according to claim 1, wherein the membrane protein is a TRP channel, an ATP receptor, a serotonin receptor, an NMDA receptor, an AMPA receptor, a kainate receptor, a GABA receptor, an adenosine receptor, an adrenaline receptor, a metabotropic glutamate receptor, or an opioid receptor.

6. A method for manufacturing the protein chip according to any one of claims 1 to 4 and 5, comprising:
- arranging a plurality of metallic microstructures onto a plurality of steps which are arranged regularly on one surface of a substrate; and
- arranging a protein on the substrate by binding a lipid vesicle, in which an outer surface thereof is modified by a functional group and a protein is present in a lipid bilayer thereof, to the metallic microstructures via the functional group.

* * * * *